ELECTRICAL CIRCUITS HAVING TWO DIFFERENT CONDUCTIVE STATES
Filed May 19, 1960
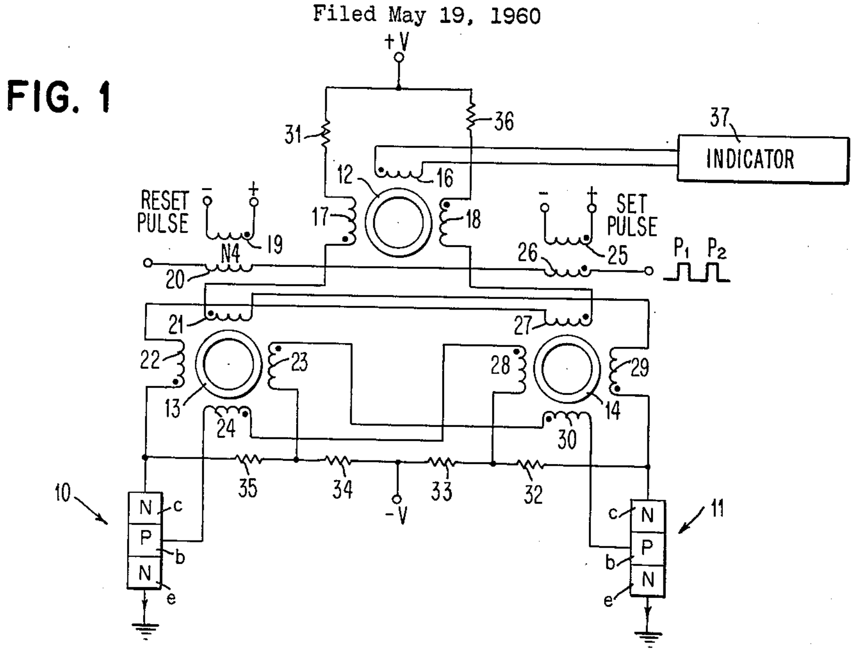
FIG. 1
FIG. 2
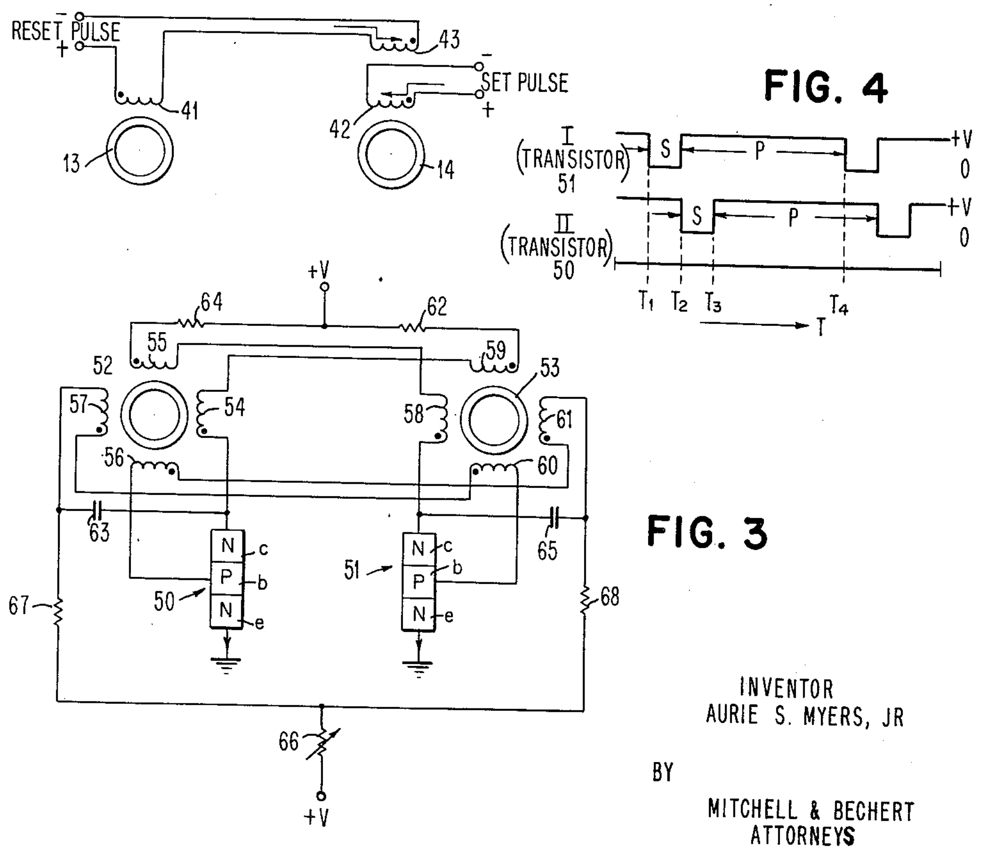
FIG. 2, FIG. 3, FIG. 4
INVENTOR
AURIE S. MYERS, JR
BY
MITCHELL & BECHERT
ATTORNEYS

United States Patent Office 3,010,030

Patented Nov. 21, 1961

3,010,030

ELECTRICAL CIRCUITS HAVING TWO DIFFERENT CONDUCTIVE STATES

Aurie S. Myers, Jr., Poughkeepsie, N.Y., assignor to International Business Machines Corporation, New York, N.Y., a corporation of New York Filed May 19, 1960, Ser. No. 30,175
12 Claims. (Cl. 307—88.5)

This invention relates to electrical circuits of the type which have two different conductive states, and more particularly to such circuits which may be positively and rapidly switched from one conductive state to the other.

Electrical circuits of this type are being employed with increasing frequency in many diversified applications. Such circuits include, among others, bistable trigger and multivibrator circuits. A bistable trigger circuit is distinguished from a multivibrator circuit in that the former is switched from one conductive state to the other by the application of inputs from an external source, while the latter is switched through the action of internal timing networks.

It is an object of the invention to provide new and improved electrical circuits of the type which have two different conductive states.

It is another object of the invention to provide means whereby such circuits may be positively and rapidly switched from one conductive state to the other.

It is a further object of the invention to provide such means which are equally applicable to circuits of the bistable trigger or multivibrator type.

An electrical circuit in accordance with the invention comprises a first and a second transistor, and circuit means for switching first one of the transistors into conduction and then the other of the transistors into conduction. Such switching circuit means includes a pair of magnetic cores each having a first and a second stable magnetic state and a plurality of windings associated with each of the magnetic cores. A first path connects the output of the first transistor with the switching input of the second transistor and includes a first winding associated with the first core and a second winding associated with the second core. A second path connects the output of the second transistor with the switching input of the first transistor and includes a first winding associated with the second core and a second winding associated with the first core. A third path connects a source of voltage to the output of the first transistor and includes a third winding associated with the first core, the winding being polarized to switch the first core in response to the switching of the first transistor into a conductive state. A fourth path connects the source of voltage to the output of the second transistor and includes a third winding associated with the second core, the winding being polarized to switch the second core in response to the switching of the second transistor into a conductive state. Means are provided for alternately switching the cores, each core being in such state when switched by such means and its first and second windings being so polarized that the switching causes the first winding to produce conduction in the associated transistor, and to produce cut-off in the associated transistor.

A complete understanding of the invention may be obtained from the following detailed description of means forming specific embodiments thereof, when read in conjunction with the appended drawings, in which:

FIG. 1 is a circuit diagram of a binary trigger circuit in accordance with the invention;

FIG. 2 is a circuit diagram of trigger means which may be employed with the binary trigger circuit of FIG. 1;

FIG. 3 is a circuit diagram of a multivibrator circuit in accordance with the invention; and FIG. 4 is a chart of the output signals derived from the multivibrator circuit of FIG. 3.

FIG. 1 illustrates a bistable trigger circuit in accordance with the invention. The circuit includes two transistor elements 10 and 11. In this embodiment, the transistors are illustrated as being of the NPN junction type, with the N region *c* being utilized as the collector electrode, the P region *b* as the base electrode, and the N region *e* as the emitter electrode. The circuit further includes three bistable magnetic core elements 12, 13, and 14. Switching of the trigger circuit from one state to the other is accomplished by means of the cores 13 and 14. The core 12 is utilized to produce a pulse output when the circuit switches from one state to the other to signal that change.

Each of the cores has a plurality of windings coupled to it. The core element 12 has three windings, 16, 17 and 18; the core element 13 has 6 windings, 19, 20, 21, 22, 23 and 24; and the core element 14 has 6 windings, 25, 26, 27, 28, 29 and 30. As is well known in the art, any one of these windings may be utilized to change the state of the magnetic core with which it is associated by the application of a voltage of the appropriate polarity and magnitude. The polarity of the applied voltage depends upon which state the magnetic core is to be switched. Conversely, a change of state by a magnetic core will produce a voltage in the windings associated with that core. The polarity of the induced voltage will again depend upon to which state the magnetic core has been switched.

The description is simplified by using conventional dot notation to indicate winding polarity and by denoting the magnetic states of the cores as either state "1" or state "0." An arbitrary convention may then be established wherein current flowing into the dotted end of a winding changes the magnetic state of the associated core from "1" to "0," while current flowing into the undotted end of the winding changes the magnetic state of the core from "0" to "1."

A feature of the present invention is the integration of these cores and core windings into the transistor circuitry to provide a fast-acting and positive bistable trigger action. To this end, the transistor and core elements are interconnected by means of three feedback paths, two of which are A.C. or pulse paths, the other being a D.C. path. The D.C. feedback path comprises a resistor 31, the windings 17, 21, 29; resistors 32, 33, 34, 35, the windings 22, 27, 18 and a resistor 36. The A.C. feedback paths comprise (1) the windings 30 and 23, and the resistor 35, and (2) the windings 24 and 28, and the resistor 32.

The resistors in the circuit also provide D.C. biasing voltages for the transistors 10 and 11. To this end, the resistors 31, 32 and 33 are connected in a series circuit arrangement, as are the resistors 34, 35 and 36. Both of these series circuit arrangements are connected in parallel across a source of D.C. voltage as symbolized by the notations +V and −V. Bias is then provided for the transistor 10 by connecting its collector to the more positive end of the resistor 35, the more positive end of the resistor 33 to the transistor base (through the windings 28 and 24), and its emitter to ground. Similarly, bias is provided for the transistor 11 by connecting its collector to the more positive end of the resistor 32, the more positive end of the resistor 34 to the transistor base (through the windings 23 and 30), and its emitter to ground. With these biasing arrangements, the transistors 10 and 11 may be switched into conduction or non-conduction by the application of appropriate cut-on or cut-off potentials to their base electrodes, while the outputs of the transistors are derived from their collector electrodes.

In describing the operation of the circuit of FIG. 1, it will be assumed that the circuit is resting in one of its stable states; that is, the circuit conditions are such that one of the transistor elements, for example, the transistor 11, is conducting while the other, the transistor 10, is non-conducting. With the transistor in these given states, the circuit arrangement is adapted so that the cores 12 and 14 are in their "1" condition, while the core 13 is in its "0" condition. Furthermore, the resistive values are such that the potential applied to the base electrode of the conducting transistor 11 (the potential at the junction of the resistors 34 and 35) is positive, while the potential applied to the base electrode of the non-conducting transistor 10 (the potential at the junction of the resistors 32 and 33) is negative.

It is characteristic of a bistable trigger circuit that it will remain in a given stable state until triggered by an externally applied impulse. In the circuit of FIG. 1, such impulse may take the form of a positive voltage pulse $P_1$ applied to the windings 26 and 20. The resultant current will flow into the dotted end of the winding 26 and, thus, according to the convention established, will change the magnetic state of the core 14 from "1" to "0." Current also flows into the dotted end of the winding 20 but, since the core 13 is already in the magnetic state "0," no change will occur in it.

The change of state of the core 14 will, in turn, induce a voltage in each of its associated windings. According to the convention established, this voltage will have a positive polarity at the dotted end of the winding 30. This results in the application by the winding 30 of a negative potential to the base electrode of the transistor 11. The winding 30 is adapted such that the value of this negative potential is sufficient to overcome the positive potential applied to the base by the bias network. As a result, the negative potential acts as a cut-off bias which prevents conduction through the transistor 11.

At the same time, the winding 28 applies a positive potential to the base electrode of the transistor 10, the winding 28 being adapted so that the value of this positive potential is sufficient to overcome the negative potential applied to the base by the bias network. As a result, the positive potential acts as a cut-on bias which initiates conduction in the transistor 10.

The application of the pulse $P_1$, therefore, triggers the process of switching the circuit of FIG. 1 from one stable state to the other, by cutting off the previously conducting transistor and cutting on the previously non-conducting transistor. Various feedback phenomena also take place during this switching period which make the switching action a swift and positive one.

One such feedback results from the cutting off of the transistor 11. This causes current formerly flowing into its collector *c* to be diverted through the resistors 32 and 33. As a result, the potential at the junction between the resistors 32 and 33 becomes more positive, which, in turn, makes the potential at the base of the transistor 10 more positive. This action, therefore, aids the positive bias potential applied by the winding 28 to drive the transistor 10 into conduction.

The initiation of conduction in the transistor 10, on the other hand, diverts current formerly flowing through the resistors 34 and 35 into its collector *c*. As a result, the potential at the junction between the resistors 34 and 35 becomes more negative; which, in turn, makes the potential at the base of the transistor 11 more negative. This action, therefore, aids the negative bias potential applied to the winding 30 to cut-off the transistor 11.

The low impedance path provided through the transistor 10 as a result of its initiation into conduction causes increased current to flow through the winding 22. Since this current flows into the undotted end of the winding 22, it tends to change the magnetic state of the core 13 from its magnetic state "0" to the magnetic state "1." The circuit is adapted so that this increase in current is, in fact, sufficient to cause such change in state. Furthermore, in view of the fact that the winding 20 when energized by the impulse $P_1$ tends to maintain the core 13 in its "0" magnetic state, the circuit may be adapted so that this change of state is postponed until the input impulse $P_1$ is removed.

In any event, the change of state of the core 13 causes a further feedback action which aids the positive and rapid action of the circuit. This is due to the induction of voltage in the windings 23 and 24 by the change of state. In accordance with the convention established, the voltage induced in the winding 24 will be positive at the undotted end of the winding. This applies an additional positive potential to the base of the transistor 10 which further drives that transistor into conduction. On the other hand, the voltage induced in the winding 23 is negative at the dotted end of the winding. This applies an additional negative potential to the base of the transistor 11 which expedites the cut-off of that transistor.

The increased current through the path provided by the transistor 10 also flows through the winding 18 associated with the core 12. In this case, the current flows into the dotted end of the winding, thus tending to change the magnetic state of the core 12 from "1" to "0." In fact, the circuit is adapted so that the increased current causes such change in state. The core 12, may, therefore, be utilized to signal, through the medium of the output winding 16 coupled to an indicator circuit 37, the state of the trigger circuit.

As a result of the application of the pulse $P_1$, therefore, the trigger circuit is switched from its initial condition in which the transistor 11 was conducting, the transistor 10 was non-conducting, the cores 12 and 14 were in the magnetic state "1" and the core 13 was in the magnetic state "0," into its other condition in which the transistor 10 is conducting, the transistor 11 is non-conducting, the cores 12 and 14 are in the magnetic state "0" and the core 13 is in the magnetic state "1." In this latter condition, the trigger circuit is in readiness to be switched back into its former condition upon the application of another input pulse $P_2$. The actions causing this switching back are essentially the same as those described hereinbefore. Consequently, the trigger circuit may be repetitively switched from one condition to the other by the application of successive input pulses.

It will be noted that a set winding 25 and a reset winding 19 are optionally provided in the trigger circuit, the set winding being associated with the core 14 and the reset winding with the core 13. These windings may be used when it is desired selectively to switch the circuit into one of its conditions or the other by the application of pulses of the appropriate polarity. Windings 21 and 27 also are optionally provided in the trigger circuit. They are utilized to insure proper D.C. resetting.

In a particular embodiment of the trigger circuit of FIG. 1, which was successfully operated up to a frequency of 500 kc., the following values of constants and components were utilized:

| | | |
|---|---|---|
| Resistors **31** and **36** | ohms | 120 |
| Resistors **32** and **35** | do | 3,000 |
| Resistors **33** and **34** | do | 15,000 |
| Winding **16** | turns | 40 |
| Windings **17**, **18**, **23**, **24**, **28** and **30** | do | 30 |
| Windings **19**, **20**, **25** and **26** | do | 10 |
| Windings **21**, **22**, **27** and **29** | do | 4 |
| Transistors **10** and **11** | type | NPN junction |
| Cores **12**, **13** and **14** | do | square loop |
| V | volts | 12 |

An alternative means for setting or resetting the trigger circuit of FIG. 1 is illustrated in FIG. 2. Only the cores 13 and 14 of the trigger circuit are illustrated, it being understood that the remainder of the circuit (other than the set and reset means) is the same as in FIG. 1. In this case, as before, a reset winding 41 is associated wtih the core 13 and a set winding 42 is associated with the core 14. In addition, however, an auxiliary winding 43 associated with the core 14 is connected in series with the reset winding 41 so as to be energized by the reset pulse.

The set and reset arrangement of FIG. 2 is adapted so that preferential treatment is given to the reset pulse if both the set and reset pulses are coincidentally applied.

In the following description, the standard convention is adapted whereby in the reset state of the trigger, transistor 11 is conducting and its associated core 14 is in its "1" state. Conversely, in the set condition, transistor 10 is conducting and core 13 is in its "1" state.

If a pulse of the polarity shown is applied to set winding 42 only, the core 14 will be switched to its "0" state (if it was previously in its "1" state), and transistor 11 will be rendered non-conductive, indicating the set condition of the trigger. If a pulse is applied to the reset and auxiliary windings only, the core 13 will be set to its "0" state (if it previously was in its "1" state) and the transistor 10 will be cut off. As described hereinabove, this will render transistor 11 conductive and switch core 14 to its "1" state. The current flow in the winding 43 is in the proper direction to aid in the switching of core 14 to a "1" and the turning on of transistor 11 and thus aids in establishing the reset state of the trigger.

If, however, both the set and reset pulses are coincidentally applied, the flux produced by the auxiliary winding 43 will buck the flux produced by the set winding 42. Consequently, the auxiliary winding 43 may be adapted so as to cancel out the switching effect of the set winding 42 when both the set and reset pulses are coincidentally applied while, at the same time, the reset winding 41 effects its function.

The operation resulting from the circuit arrangement of FIG. 2 may be referred to as "preferential reset." It is evident that a "preferential set" operation may also be effected by arranging an auxiliary winding responsive to the set pulse in operative association with the core 13 and eliminating the auxiliary winding 43.

FIG. 3 illustrates a positive and fast-acting multivibrator circuit in accordance with another aspect of the invention. In this embodiment, the transistors 50, 51 are also illustrated as being of the NPN junction type, with the N region *c* being utilized as the collector electrode, the P region *b* as the base electrode, and the N region *e* as the emitter electrode. The circuit further includes two bistable magnetic core elements 52 and 53. Each of the cores has a plurality of windings coupled to it, the core element 52 having four windings 54, 55, 56 and 57, and the core element 53 having four windings 58, 59, 60 and 61.

Multivibrator operation is characterized by an internally induced switching action which results in the cyclical production of output voltage signals, the duration of the signals and the time period between the signals being under the control of timing networks. For example, signals which may be produced by the multivibrator circuit of the present invention are illustrated in FIG. 4. The signals I appear at the collector *c* of the transistor 51, while the signals II appear at the collector *c* of the transistor 50. These signals are produced by cyclically switching each transistor between conductive and non-conductive conditions, the conductive condition producing the signals shown as having a duration S, the period P between the signals being the result of non-conduction.

It is also a feature of this aspect of the invention to integrate the cores, core windings and transistor circuitry above-described with the timing networks required to provide a positive and fast-acting multivibrator action. To this end, the transistor and core elements are interconnected by means of four timing networks. A first one of this networks influences the time duration S of the signal produced by the transistor 51, and comprises a series path which includes a resistor 62 connected to a source of voltage +V, winding 59, winding 54, a capacitor 63, winding 57, and winding 60 which is connected to the base of the transistor 51. In this network, the junction of the capacitor 63 and the winding 54 is connected to the collector of the transistor 50. A second of the networks influences the time dration S of the signal produced by the transistor 50, and comprises a series path which includes a resistor 64 connected to the source of voltage +V, winding 55, winding 58, a capacitor 65, winding 61 which is connected to the base of the transistor 50. In this network, the junction of the capacitor 65 and the winding 58 is connected to the collector of the transistor 51. A third of the networks influences the period P between the signals produced by the transistor 51, and comprises the source of voltage +V, a variable resistor 66, a resistor 67 connected to the junction of the capacitor 63 and the winding 57, and the capacitor 63. A fourth of the networks influences the period P between the signals produced by the transistor 50, and comprises the source of voltage +V, the variable resistor 66, a resistor 68 connected to the junction of the capacitor 65 and the winding 61, and the capacitor 65.

In describing the operation of the circuit of FIG. 3, the same dot notation of the windings as used hereinbefore will be employed. Furthermore, let it be assumed that the circuit is in the condition indicated in FIG. 4 at the time $T_1$. At this time, the transistor 51 is just being switched into conduction by the circuit, the core 52 being in its "1" state the core 53 being in its "0" state. This results in a flow of current from the voltage source +V through the resistor 64, the windings 55, the winding 58 and the transistor 51 to ground. This current flows into the dotted end of the winding 55 and into the undotted end of the winding 58. As a result, according to the convention established, this current will switch the core 52 into the "0" state and the core 53 into the "1" state.

The change of state of the core 53 induces a voltage across each of the associated windings. This voltage will be positive at the undotted end of the winding 60, and, consequently, a more positive potential is applied to the base electrode of the transistor 51. This positive potential acts as a bias which further drives the transistor 51 into conduction. Accordingly, a positive feedback action takes place between the windings 58 and 60. The consequence of this conduction is to connect the collector electrode of transistor 51 essentially to ground through the emitter electrode *e*. This is shown on of FIG. 4 for the signal I at the time $T_1$.

Other actions also take place at the time $T_1$ which aid further steps in the operation. Thus, the switching of the core 52 induces a potential which is negative at the undotted end of its winding 57. This potential adds to the also negative potential at the dotted end of the winding 60 and the sum appears at the junction of the resistor 67 and the capacitor 63. The junction point is thus driven to a negative potential because the base of the transistor 51 is effectively clamped to ground by the path through the emitter electrode *e*.

Another action which takes place results from the connection of the collector of transistor 51 from its higher non-conducting potential (+V) to ground. This causes the capacitor 65 to apply a highly negative potential to the base of the transistor 50. Furthermore, the windings 61 and 56, as a result of the switching of the cores, also apply negative potentials to the base of the transistor 50. As a result, the transistor 50 is swiftly cut-off during the time that transistor 51 is conducting.

The conduction of the transistor 51 also provides a path for charging of the capacitor 63. This path includes the resistor 62, the winding 59, the winding 54, the capacitor 63, the winding 57, the winding 60, and the base-emitter of the transistor 51. The time constant of this path may be made comparatively short compared, for example, to the time constant of the discharge path of the capacitor 65 through the resistors 68 and 66. Furthermore, this path is effectively connected to a source of voltage greater than +V due to the fact that the windings in the path all add energy as a result of the switching of the cores. Accordingly, the capacitor 63 takes a relatively short time to charge. In addition, the charging path acts as a load on the core 53 and thereby may be utilized to control its switching time.

The charging of the capacitor 63 occurs between the times $T_1$ and $T_2$ on the chart of FIG. 4. The time $T_2$ is determined by the switching time of the core 53. After the core 53 has completed its switch into the "1" state, the transistor 51 stops conducting. This is due to the fact that the windings 60 and 57 no longer apply a positive potential to the base electrode of the transistor 51 which, accordingly, is connected to the negative potential at the junction of the capacitor 63 and the resistor 67. This results in the collector of the transistor 51 being no longer connected to ground and being returned to the potential +V. The return of the collector of the transistor 51 to +V applied a positive potential (through the capacitor 65 and the windings 61 and 56) to the base electrode of the transistor 50. As a result, the transistor 50 is driven into conduction and the potential at its collector goes to ground (FIG. 4).

Conduction through the transistor 50 results in a number of actions analogous to those which occurred as a result of conduction through the transistor 51. Thus, current through the windings 59 and 54 results in switching of the core 53 back to "0" and the core 52 back to "1." Positive feedback occurs between the windings 54 and 56, further driving the transistor 50 into conduction. The windings 56 and 61 apply a negative potential to the junction of the resistor 68 and the capacitor 65 since the base electrode of the transistor 50 is effectively clamped to ground through the emitter electrode. And, the transistor 51 is held in a non-conductive state by the application of a negative potential to its base electrode from the capacitor 63 and the windings 57 and 60.

Furthermore, conduction through the transistor 50 provides a path for charging of the capacitor 65. This path includes the resistor 64, the winding 55, the winding 58, the capacitor 65, the winding 61, the winding 56 and the base-emitter of the transistor 50. The time constant of this path may also be made comparatively short compared, for example, to the time contant of the discharge path of the capacitor 63 through the resistors 67 and 66. Furthermore, this path also is effectively connected to a source of voltage greater than +V due to the fact that the windings in the path all add energy as a result of the switching of the cores. In addition, this path also acts as a load on the core 52 and thereby may be utilized to control its switching time.

The charging of the capacitor 65 occurs between the times $T_2$ and $T_3$ on the chart of FIG. 4. The time $T_3$ is determined by the switching time of the core 52. After the core 52 has completed its switch into the "1" state, the transistor 50 stops conducting. This is due to the fact that the windings 56 and 61 no longer apply a positive potential to the base electrode of the transistor 50 which, accordingly, is connected to the negative potential at the junction of the capacitor 65 and the resistor 68. Consequently, the collector of the transistor 50 is returned to its +V potential.

At this point, the similarity between the actions occurring as a result of conduction in the transistor 51 and in the transistor 50 ceases. As seen on the chart of FIG. 4 the return of the collector of the transistor 50 to +V does not result in driving the transistor 51 into conduction (through the capacitor 63 and the windings 57 and 60). This is due to the fact that the relatively long time constant of the discharge path for the capacitor 63 has not permitted the capacitor 63 to discharge sufficiently at the time $T_3$, the remaining charge on the capacitor 63 therefore retaining the transistor 51 cutoff despite the cutting off of the transistor 50. The reason that the capacitor 65 did not have a similar effect on the transistor 50 at the time $T_2$ is due to its having discharged at that time to below the cutoff level, as will be described shortly.

After the time $T_3$ both of the transistors 50 and 51 remain cut off. It will be remembered that the capacitor 63 was charged between the times $T_1$ and $T_2$ and began discharging at the time $T_2$. On the other hand, the capacitor 65 was charged between the times $T_2$ and $T_3$ and began discharging at the time $T_3$. Assuming, then that the values of the resistors 67 and 68 are equal, as in the preferred case, the discharging of the capacitor 63 will lead the discharging of the capacitor 65 by the period S. Accordingly, the capacitor 63 will discharge to a point where it removes its cutoff potential from the base of the transistor 51 prior to the time that the capacitor 65 removes its cutoff potential from the base of the transistor 50. The time that the capacitor 63 arrives at this point is $T_4$ on the chart of FIG. 4. Since the duration P is, therefore, dependent on the discharge time of the capacitor 63, it may be controlled by the variable resistor 66 in the discharge path.

At time $T_4$, then, the transistor 51 starts conducting as at the time $T_1$. Also, at the time $T_4$, the cores 52 and 53 are in the same respective states they were in at the time $T_1$. Consequently, the cycle already described begins once again in typical multivibrator fashion.

In a particular embodiment of the multivibrator circuit of FIG. 3, the following values of constants and components were utilized.

| | | |
|---|---|---|
| Resistors **62** and **64** | ohms | 100 |
| Resistors **67** and **68** | do | 12,000 |
| Variable resistor **66** | do | 0–25,000 |
| Capacitors **63** and **65** | microfarads | 0.0047 |
| Windings **55** and **59** | turns | 3 |
| Windings **54** and **58** | do | 4 |
| Windings **56**, **57**, **60** and **61** | do | 30 |
| Transistors **50** and **51** | type | NPN junction |
| Cores **52** and **53** | do | square loop |
| V | volts | 12 |

It is to be understood that the above described arrangements are simply illustrative of the application of the principles of the invention. Numerous other arrangements may be devised by those skilled in the art which will embody the principles of the invention and fall within the spirit and scope thereof.

What is claimed is:

1. An electrical circuit, comprising a first and a second transistor each having an output and a switching input, and circuit means for switching first one of said transistors into conduction and then the other of said transistors into conduction, said circuit means including a pair of magnetic cores each having a first and second stable magnetic state, a plurality of windings associated with each of said magnetic cores, a first path connecting the output of said first transistor with the switching input of said second transistor, said first path including a first winding associated with said first core and a second winding associated with said second core, a second path connecting the output of said second transistor with the switching input of said first transistor, said second path including a first winding associated with said second core and a second winding associated with said first core, a source of voltage, a third path connected between said source of voltage and the output of said first transistor including a third winding associated with said first core and polarized to switch said first core in response to the switching of said first transistor into a conductive state, a fourth path connected between said source of voltage and the output of said second transistor including a third winding associated with said second core and polarized to switch said second core in response to the switching of said second transistor into a conductive state, and means for alternately switching said cores, each core being in such state when switched by said means and its said first and second windings being so polarized that said switching causes said first winding to produce conduction in the associated transistor and said second winding to produce cut-off in the associated transistor.

2. An electrical circuit in accordance with claim 1, in which said means for alternately switching said cores includes a separate fourth winding for each of said cores.

3. An electrical circuit in accordance with claim 1, in which each said transistor includes a collector, an emitter and a base electrode, said output being derived from said collector electrode, said switching input being connected to said base electrode, and said emitter electrode being connected to a reference potential.

4. An electrical circuit in accordance with claim 1, in which said means for alternately switching said cores is periodically made operative to switch one of said cores by the application of preselected inputs spaced in time, said means being further adapted when so operated to switch that one of the said cores having a said third winding which is associated with that one of the said transistors then conducting.

5. An electrical circuit in accordance with claim 4, in which said means for alternately switching said cores includes a separate fourth winding for each of said cores, said windings being connected in series and being polarized in the same direction, and means for applying voltage impulses spaced in time to said series connected windings.

6. An electrical circuit in accordance with claim 4, in which said means for alternately switching said cores includes a separate fourth winding for each of said cores, and a fifth auxiliary winding associated with one of said cores and connected in series with the fourth winding associated with the other of said cores, said series connected windings being oppositely polarized.

7. An electrical circuit in accordance with claim 1, in which said means for alternately switching said cores includes a separate fourth winding for each of said cores, the fourth winding associated with said first core being connected in series with the third winding associated with said second core thereby to be periodically made operative by conduction through said second transistor, the fourth winding associated with said second core being connected in series with the third winding associated with said first core thereby to be periodically made operative by conduction through said first transistor, and timing networks included in said circuit for alternately causing first one and then the other of said transistor to conduct.

8. An electrical circuit in accordance with claim 7, in which said timing networks include a first capacitor connecting said first path to the output of said first transistor, a second capacitor connecting said second path to the output of said second transistor, and resistive means connecting the ends of said capacitors remote from said outputs to a preselected reference potential.

9. An electrical circuit in accordance with claim 8, in which each said transistor includes a collector, an emitter and a base electrode, said output being derived from said collector electrode, said switching input being connected to said base electrode, and said emitter electrode being connected to a reference potential.

10. An electrical circuit in accordance with claim 4, which further includes a first voltage divided network connected at one end between said third path and the output of said first transistor and at the other end to a reference potential and a second voltage divider network connected at one end between said fourth path and the output of said second transistor and at the other end to a reference potential, said first path being connected to the output of said first transistor through a preselected portion of said first voltage divider network, and said second path being connected to the output of said second tarnsistor through a preselected portion of said second voltage divider network.

11. An electrical circuit in accordance with claim 10, in which each said transistor includes a collector, an emitter and a base electrode, said output being derived from said collector electrode, said switching input being connected to said base electrode, and said emitter electrode being connected to a reference potential.

12. An electrical circuit in accordance with claim 10, which further includes a third magnetic core having a first and a second stable magnetic state, a plurality of windings associated with said third magnetic core, a first of said windings being connected in series with the third winding associated with said first core thereby to be made operative by conduction through said first transistor, a second of said windings being connected in series with the third winding associated with said second core thereby to be made operative by conduction through said second transistor, and means responsive to the magnetic state of said third core for indicating which of the said transistors is conducting.

References Cited in the file of this patent

UNITED STATES PATENTS

| | | |
|---|---|---|
| 2,891,170 | Paull | June 16, 1959 |
| 2,939,115 | Bobeck | May 31, 1960 |
| 2,945,965 | Clark | July 19, 1960 |